J. G. SJÖSTRÖM.
METHOD OF AND MEANS FOR FILLING MATCH SPLINTS INTO CONVEYER PLATES AND THE LIKE.
APPLICATION FILED AUG. 7, 1915.
1,292,896.
Patented Jan. 28, 1919.
7 SHEETS—SHEET 4.
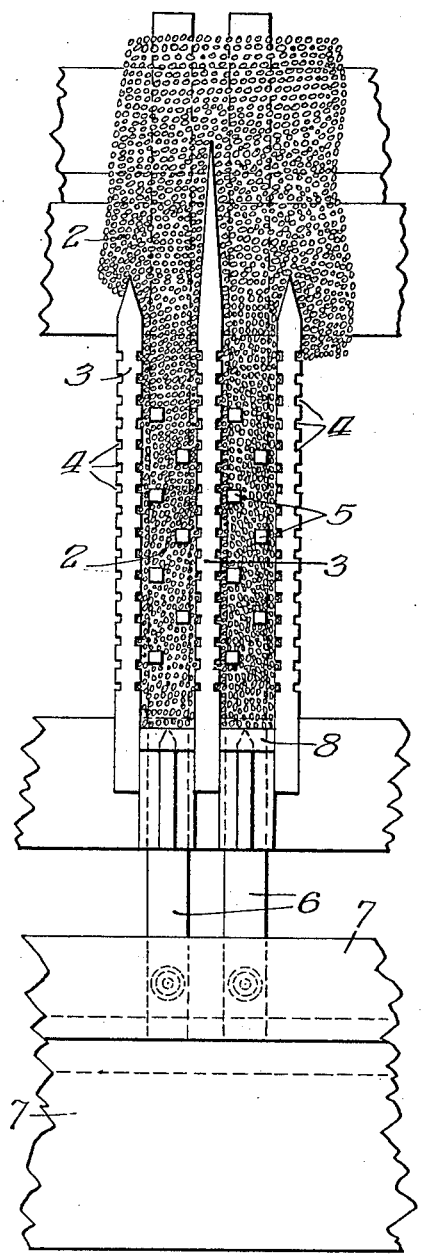
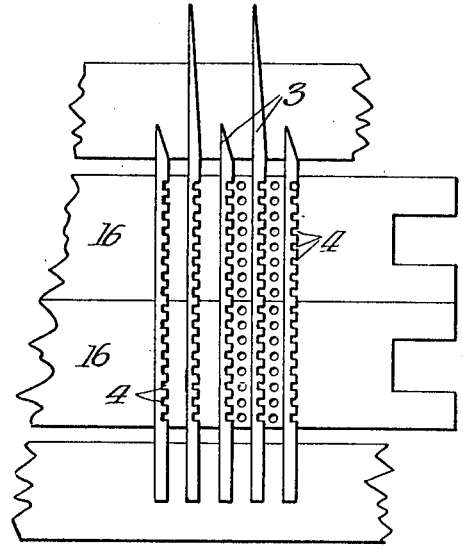
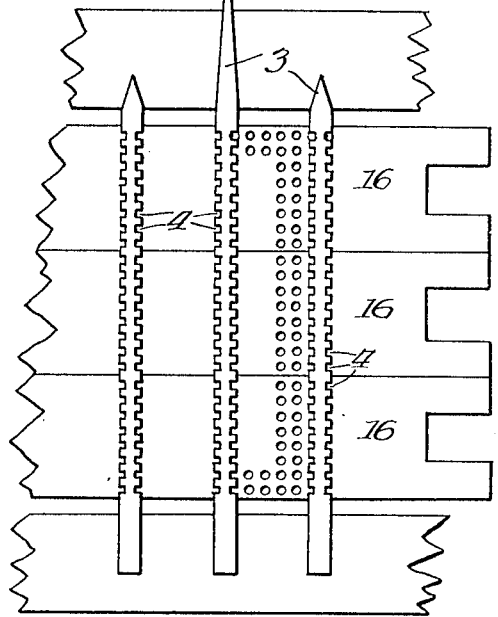
Inventor:
John Gotthard Sjöstrom
By George Bayard Jones
Atty

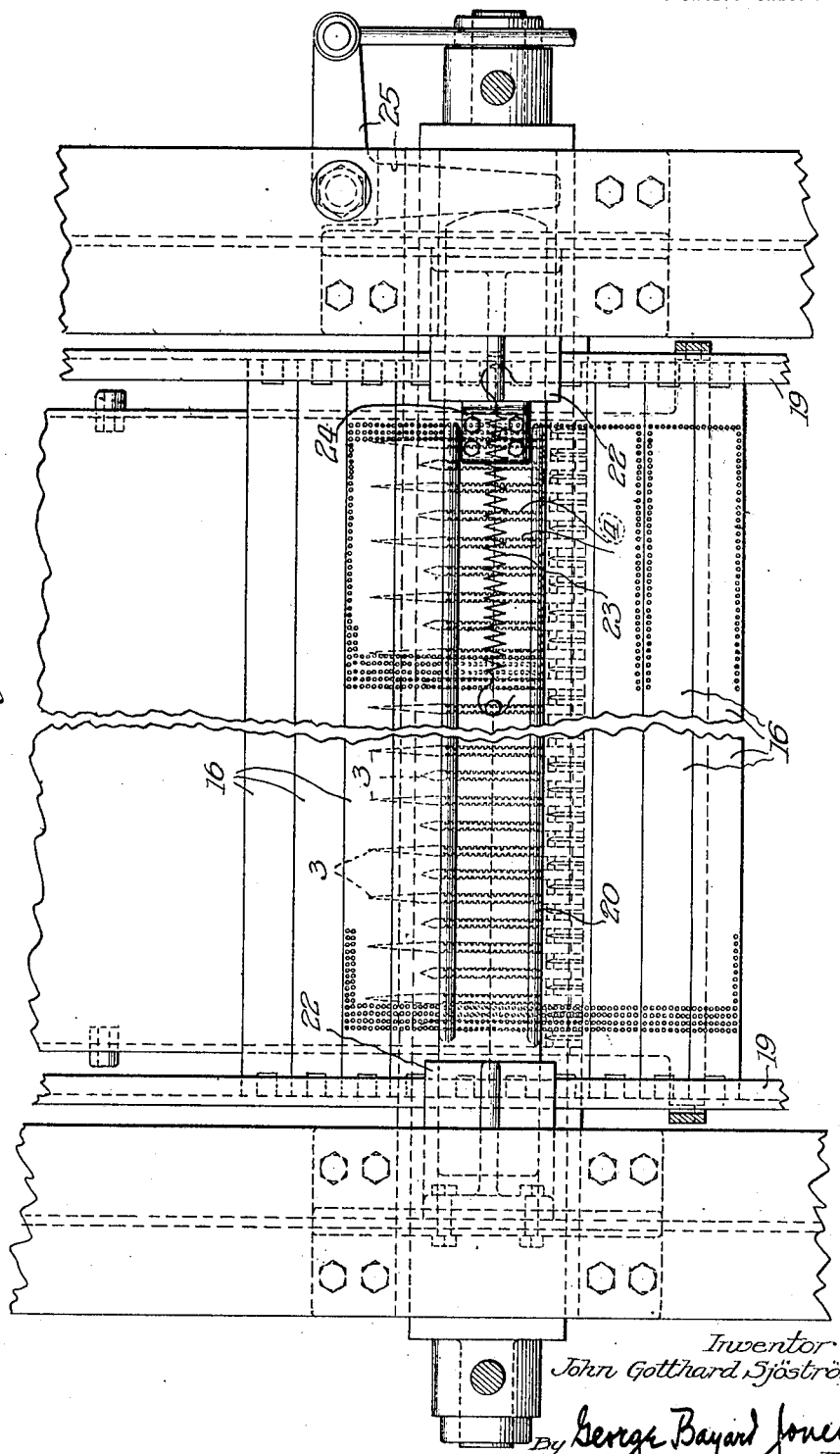

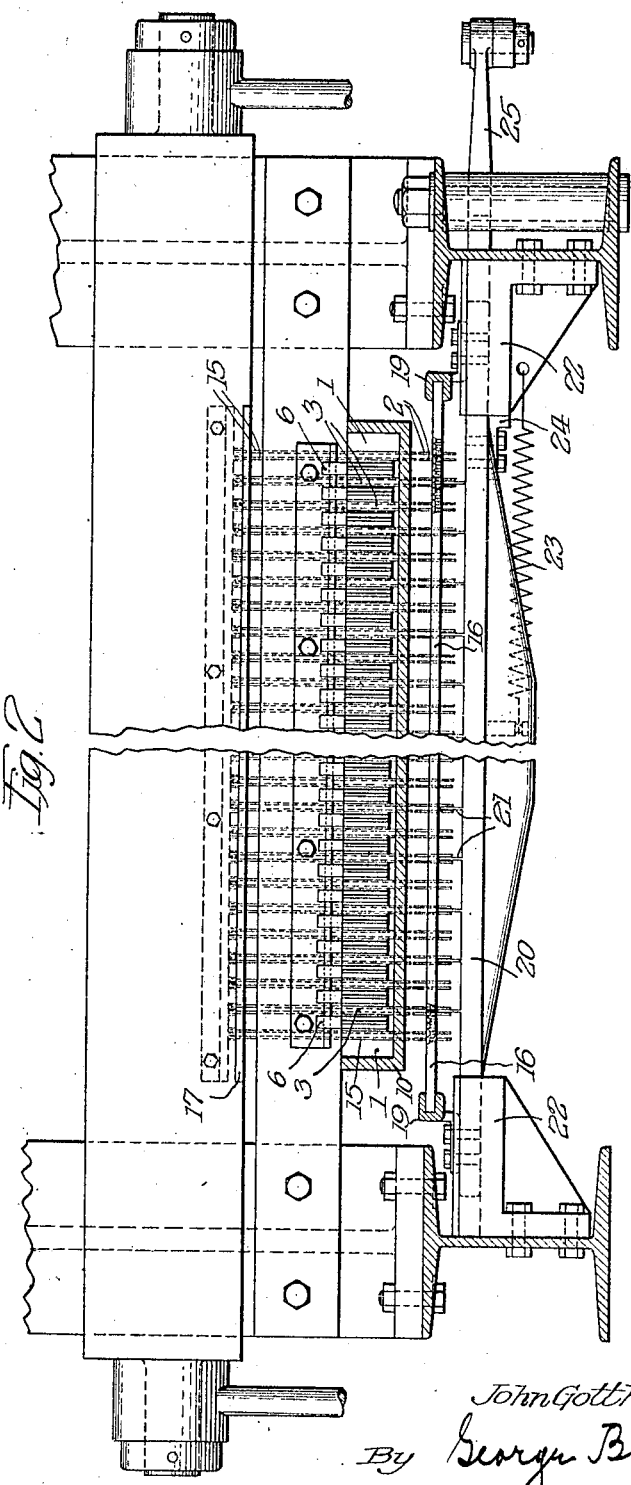

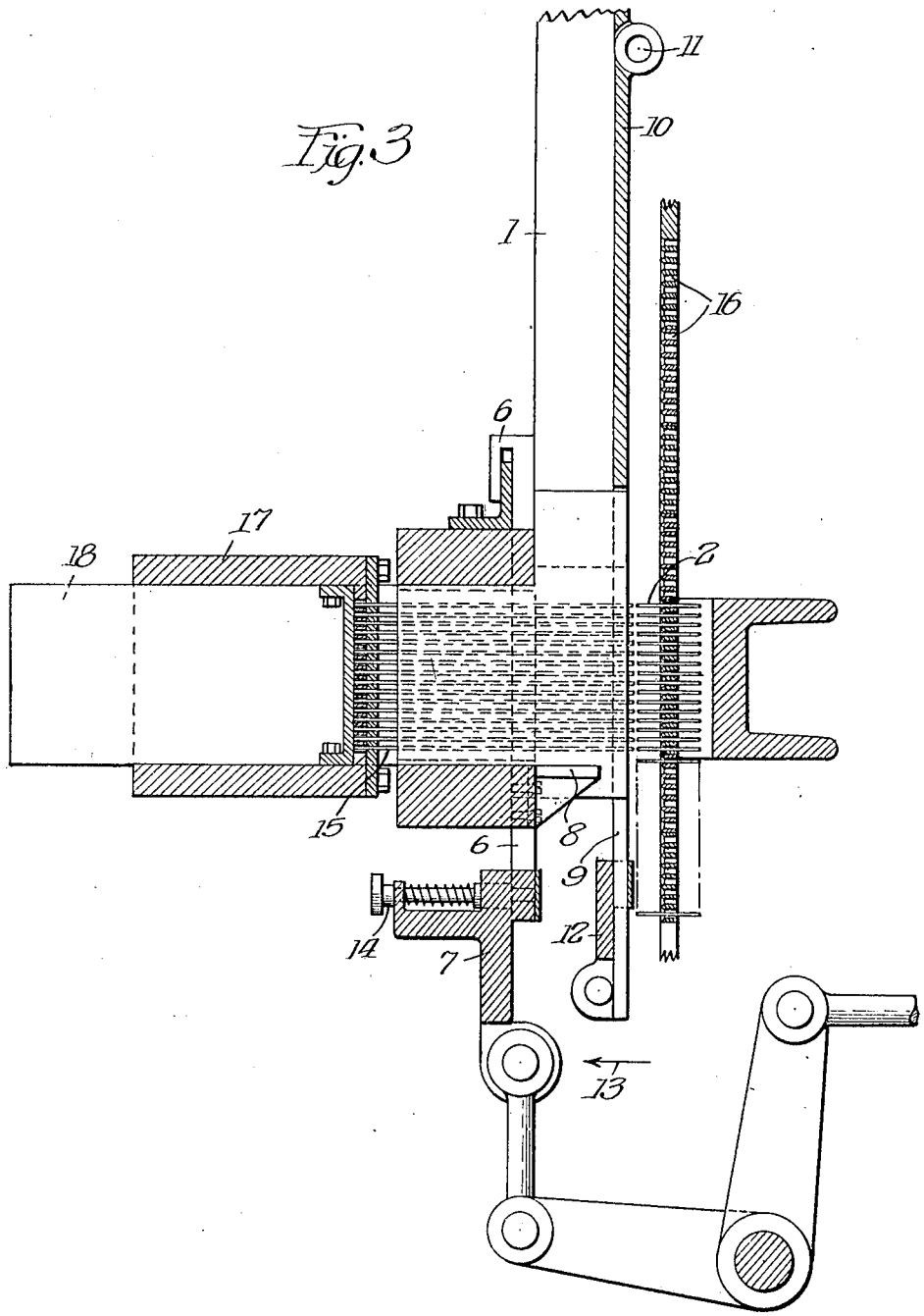

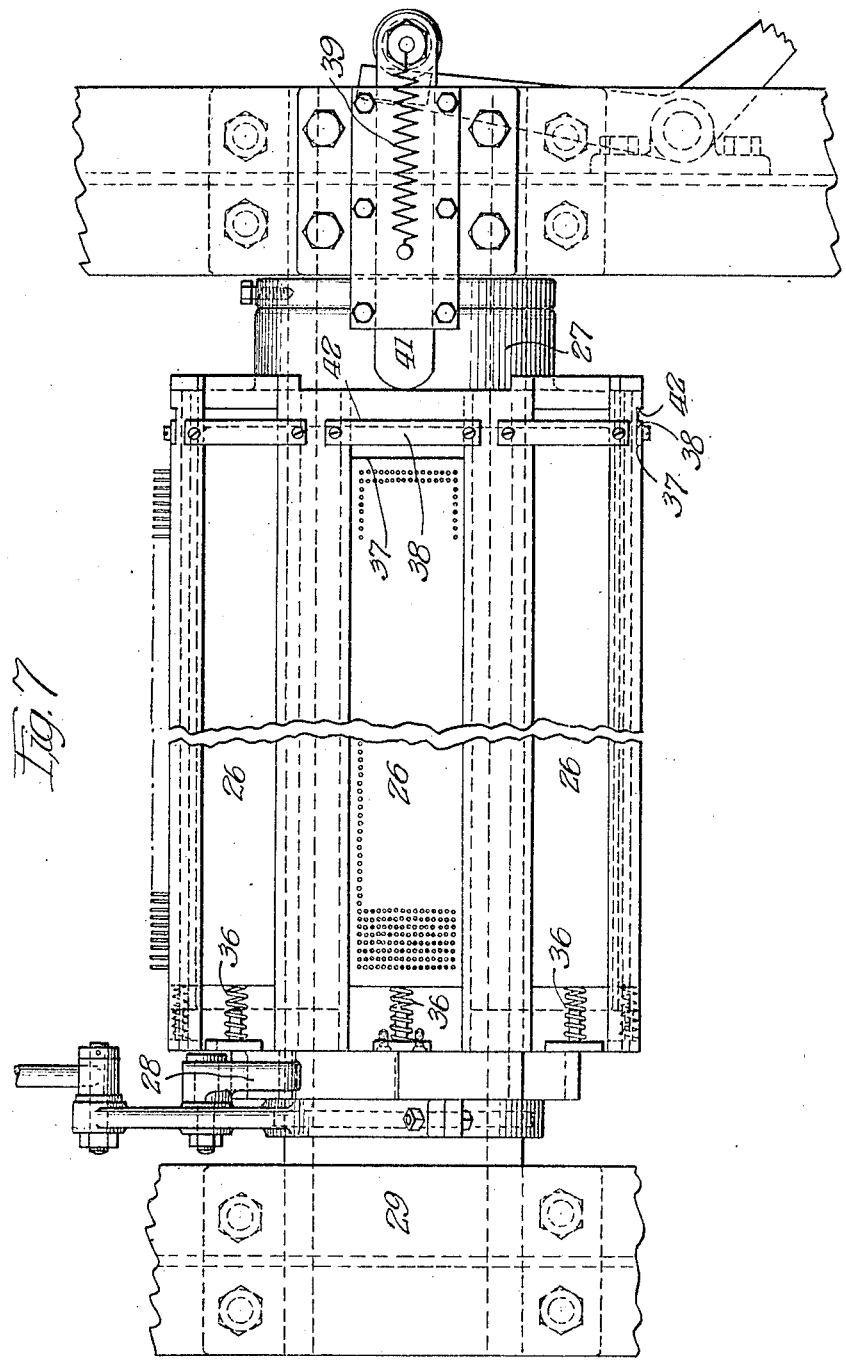

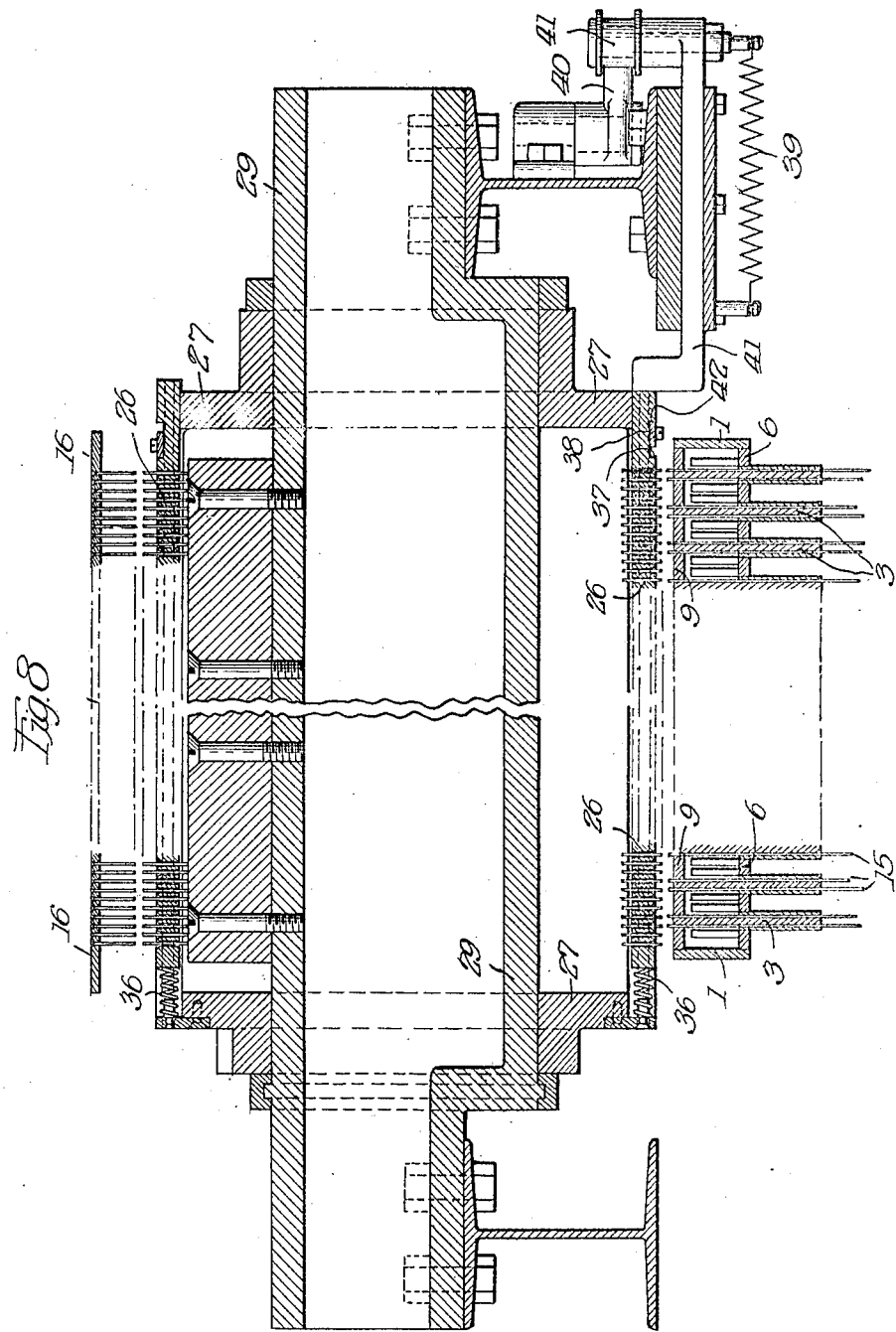

J. G. SJÖSTRÖM.
METHOD OF AND MEANS FOR FILLING MATCH SPLINTS INTO CONVEYER PLATES AND THE LIKE.
APPLICATION FILED AUG. 7, 1915.
1,292,896.
Patented Jan. 28, 1919.
7 SHEETS—SHEET 7.
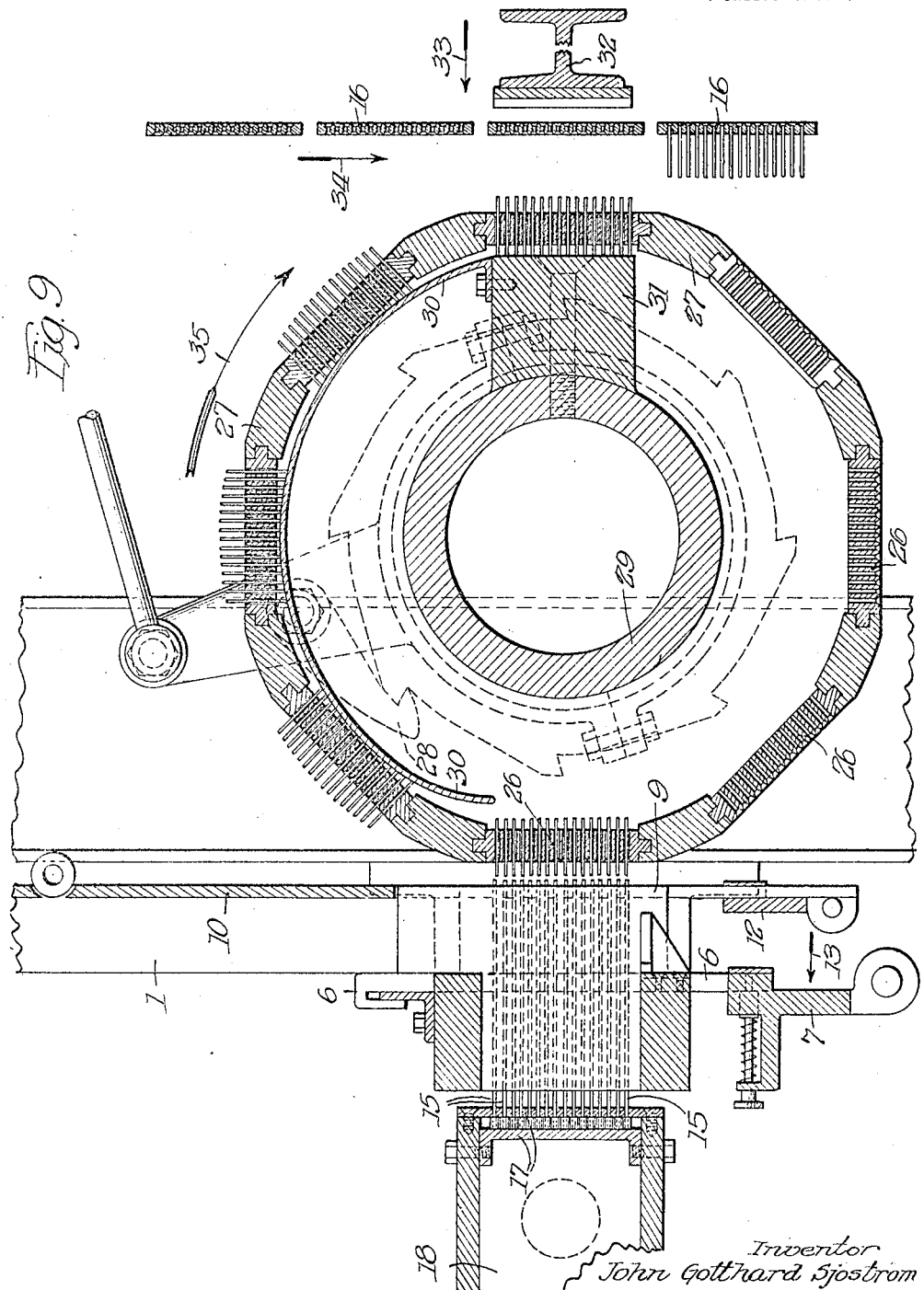
Inventor
John Gotthard Sjostrom
By George Bayard Jones
Atty

UNITED STATES PATENT OFFICE.

JOHN GOTTHARD SJÖSTRÖM, OF JÖNKÖPING, SWEDEN.

METHOD OF AND MEANS FOR FILLING MATCH-SPLINTS INTO CONVEYER-PLATES AND THE LIKE.

1,292,896.  Specification of Letters Patent.  Patented Jan. 28, 1919.

Application filed August 7, 1915. Serial No. 44,363.

*To all whom it may concern:*

Be it known that I, JOHN GOTTHARD SJÖSTRÖM, a subject of the King of Sweden, residing at Jönköping, in the Kingdom of Sweden, have invented a new and useful Improvement in Methods of and Means for Filling Match-Splints into Conveyer-Plates and the like, of which the following is a specification.

This invention relates to a method of filling splints into conveyer plates and the like, and to means for performing this method. This method is especially intended to be applied to automatic match making machines in which the filling of the splints or cut match wood into the conveyer plates moving in a closed path through the machine takes place while the plates pass in front of a filling device.

The object of the present invention is to increase the output of machines of the said kind. For this purpose the present method consists in this that either the conveyer plates themselves, or one or several intermediate receivers, if such are used for receiving the splints from the filling device, in addition to the above-named movement past the filling device are also moved one or several times in a lateral direction that is, perpendicularly or approximately perpendicularly to the direction of the first-named movement and to the direction of feeding the splints into the conveyer plates, or into the intermediate receivers, the movement in the lateral direction being effected by steps of a length equal to a multiple of the distance in the same direction between rows of splint receivers in the conveyer plates, in such manner that periodically a plurality of rows of splint receivers and then the intermediate rows of receivers are filled with splints. It is thus possible from a single magazine to fill nearly any quantity of splints into the conveyer plates, while these plates move past the filling device, and thus materially to increase the output capacity of the machine.

For performing this method the conveyer plates, or the intermediate receivers if such are used, at the place where the filling takes place must thus be guided or journaled so that they may be moved laterally.

In the accompanying drawings two embodiments of means for performing the invention are shown by way of example. Figures 1 to 6 show an embodiment in which the cut match wood or splints are filled directly into the conveyer frames. Fig. 1 shows the filling device in elevation, Fig. 2 the same viewed from above, and Fig. 3 a vertical section of the same. Fig. 4 shows to an enlarged scale a sectional view of the hopper, and Figs. 5 and 6 illustrate two modifications of the same. Figs. 7, 8, and 9 show, respectively, an elevation, a plan view, and a vetical section of another embodiment, according to which the splints are first filled into intermediate receivers and from these into the conveyer plates.

In the magazine 1 the splints 2 lie parallel to each other and sink during the operation of the machine slowly downward in the magazine. Vertical grooved plates 3 of a construction previously known in the main, project from the bottom of the magazine, and these plates are provided with grooves 4 of such size that each groove may receive one splint. In order quickly and firmly to introduce the splints into these grooves there are provided between the grooved plates bars 5 parallel with the splints and secured to guides or shaking bars 6. These bars are secured at their lower ends to a cross-piece 7 which is brought to shake in vertical direction by means of a suitable transmission from the shaft of the machine. In this manner the bars 5 will also cause the splints to shake upward and downward which will cause the splints closest to the grooves to enter these grooves 4. To the shaking bars 6 bottoms 8 are secured which support the lowermost splints. These bottoms are so dimensioned that they do not completely fill out the space between the shaking bars 6 and the tongues 9, which extend downward from the rear wall 10 of the magazine between the grooved plates 3 and which serve to prevent more than one splint at a time being pushed out of each groove 4, but one or several openings are left (see Fig. 3). The purpose of this arrangement is that splints, which for any reason rest on end in the magazine 1 and thus cannot enter the grooves 4, shall fall through.

As shown in Figs. 1 and 4 the grooved plates 3 are of different heights, every second plate 3 in the embodiment illustrated being higher than the other. The difference in height is so selected that splints which for some reason may have come athwart in the magazine, shall not be able to rest on two adjacent grooved plates, but shall be forced to stand on end, so that they may fall through the openings in the bottom of the magazine mentioned above. For the same purpose every third or every fourth grooved plate may also be made higher than the rest, depending upon the distance between the grooved plates in relation to the length of the splints.

In order to facilitate the falling through of such splints which stand on end in the magazine back of the layer of splints in the same, the rear wall 10 of the magazine is hinged on a pin 11, and the tongues 9 are below joined by means of a cross-piece 12, which after each introduction of splints into the conveyer plates is moved some distance in the direction of the arrow 13 and back in the direction of length of the splints by means of some suitable mechanism. The layer of splints in the magazine is thus moved aside in such manner that a free space is formed between the splints and the tongues 9, so that splints standing on end may fall down through the opening between the bottom 8 and the tongues 9. The shaking bars 6, to which the bars 5 are secured, are suitably removably secured to the cross-piece 7 so that they may easily be removed when emptying the magazine. According to the embodiment illustrated in the drawing each shaking bar is secured to the cross piece by means of a spring-actuated pin 14. By pulling back the pin the shaking bar becomes free and may be lifted upward.

The splints 2 introduced in the grooves 4 in the manner described above are pushed in the usual manner by means of pins 15 into the conveyer plates 16 provided with holes for receiving the splints. The pins 15 are secured in a so-called pin cushion 17 guided by supports 18 rigidly secured to the machine frame and reciprocating by means of some suitable mechanism, which is not shown in the drawings.

In the embodiment illustrated in Figs. 1–4 the grooved plates 3 are so designed that for each pushing-in movement the pins 15 fill two adjacent rows of holes extending in height over two conveyer plates 16, leaving at the same time two rows of holes between the grooved plates empty to be filled at the next movement of the pins 15, the plates 16 having then been moved aside some distance. In order to produce a machine of the greatest possible output capacity in a minimum space it is clearly necessary to place the splints as nearly to each other as possible in the conveyer plates 16, the smallest possible distance practicable being about 8 mm. It is impossible, however, to place the grooved plates at such a small distance from each other, as it would then not be possible to introduce the splints in the grooves 4.

According to the present invention, therefore, the grooved plates 3 are placed at a distance from each other corresponding to such a number of rows of holes in the conveyer plates 16 as required in order that the splints may be sure to be introduced in the grooves 4, and the conveyer plates are moved, in addition to the ordinary movement in the direction of length of the grooved plates, that is, in vertical direction past the filling magazine, also one or several times a short distance in lateral direction, so that also the rows of holes in the conveyer plates between the grooved plates 3 arrive at such a position that the splints may be pushed into them from the grooves in the plates 3. In the embodiment illustrated in Figs. 1 and 4 for each pushing-in a conveyer plate is filled with 148 splints in breadth and 8 splints in height. Each grooved plate 3 has a height corresponding to two conveyer plates, that is, 16 holes above each other, and there are two rows of holes between two adjacent grooved plates. The conveyer plates 16 are moved in their transverse direction after each pushing-in movement of the pins 15 a distance equal to the height of a conveyer plate, and are also moved in lateral direction after every second pushing-in movement of the pins a distance equal to two rows of holes, that is, in this case 16 mm.

The arrangement for effecting this movement may be carried out in several ways. According to the drawing the guide rails 19 (Fig. 2) which guide the plates 16 during their movement past the filling device, are cut off and secured to a beam 20 supporting the plates by means of suitable projections 21 for preventing the conveyer plates breaking under the pressure of the splints and the pins. The beam 20 is movable laterally in bearings 22 on the machine frame and is pressed to one side (to the right in Figs. 1 and 2) by a coil spring 23 so that a stop 24 on the beam 20 rests against the right bearing 22.

In this position (shown in Fig. 2) half of the number of rows of holes in two plates 16 are filled, whereupon the whole series of plates is moved in vertical direction a distance corresponding to the height of one plate, and the two plates resting in the beam 20 are moved two rows to one side (to the left) by means of a suitable arrangement, for instance a crank lever 25, so that the rows of splints just pressed into the conveyer plates come between the grooved plates 3, and the rows of holes still empty come opposite the grooves in the grooved plates 3 and may be filled. The beam 20 with the two plates resting in the same are then moved back to the starting position (shown in Fig. 2), whereupon the whole series of plates is again moved in vertical direction a distance equal to the height of one plate.

Instead of moving the conveyer plates the height of one plate in vertical direction after each insertion of splints, it is of course also possible to move the plates 16 two heights after every second insertion. In other words, each plate is made so large that its height corresponds to the vertical number of grooves in the grooved plates 3, and after the first insertion it is only moved laterally, and after the next insertion it is moved back to the first position, after which it is moved in vertical direction and replaced by a new plate. The movement one or two heights of the plate in vertical direction may also take place without the plates having been moved back in lateral direction to the initial position.

Figs. 5 and 6 illustrate two modifications of the grooved plates 3. According to Fig. 5 each grooved plate 3 can receive only one row of splints, and the lateral movement shall thus only correspond to the distance between two adjacent rows of holes in the plates 16, that is, in this case 8 mm. According to Fig. 6, on the other hand, the grooved plates 3 are double, and each grooved plate extends in height over three conveyer plates 16. Between each two adjacent grooved plates there remain, as shown in the drawing, four rows of holes in the conveyer plates. In this case the conveyer plates must be moved twice in lateral direction in order to be filled completely.

It is evident that also in this case the three conveyer plates 16, in which the insertion of splints takes place simultaneously, may be substituted by a single plate, when the movement of the plates in vertical direction takes place after every third insertion. The number of holes in the conveyer plates may, of course, be altered as desired, without departing from the principle of the invention. The height of the grooved plates must be made two, three, or four times greater than the height of the conveyer plates, according as one, two, or three rows of holes with single grooved plates according to Fig. 5, or two, four, or six rows of holes with double grooved plates are left between two adjacent grooved plates. The arrangement illustrated in Fig. 4, however, is deemed to be the most advisable one in practice.

The embodiment illustrated in Figs. 7 to 9 differs from the one described above mainly in this that the splints are first filled into intermediate receivers movable in lateral direction, and from these they are inserted into the conveyer plates. Each intermediate receiver takes the same number of splints as a conveyer plate. The grooved plates 3 in the instance shown are double and arranged at such distance from each other that two rows of holes in the intermediate receivers are left empty between two adjacent grooved plates. The splints in the splint magazine 1 are pushed out of the grooves in the plates 3 by means of pins 15 secured to a pin cushion 17 in the same manner as in the embodiment described above. The construction of the splint magazine is also in other respects the same as illustrated in Fig. 4.

The intermediate receivers 26 which consist of plates or the like with cells and are eight in number in the embodiment illustrated, are movable in lateral direction in a drum 27, which is rotated step-by-step on a tubular member 29 in the machine frame by means of a feeder hook 28 or in other suitable manner. The receiver 26 located opposite the grooved plates 3 is half filled from the grooves in these plates the first time, after which by means of a suitable mechanism this receiver is moved so far to the side that the rows of holes which were between the grooved plates, now come opposite the grooves in these plates. A second insertion of splints now takes place so that the receiver becomes filled. The drum 27 together with its receivers is now rotated one eighth of a turn so that the next intermediate receiver 26 arrives opposite the grooved plates and is filled by two insertions. The splints are loose each one in its cell in the intermediate receivers and rest against a curved plate 30 or the like.

The intermediate receivers 26 having been rotated half a turn from the filling position, they arrive in the position where they transfer their contents to the conveyer plates 16. These latter are in this embodiment of the type where the splints are pressed into holes in which they fit tightly, as against the embodiment previously described, where they are intended to be secured in the holes by means of springs. The curved plate 30 is replaced at the emptying position by a flat cross-piece 31, which serves as a support for the splints while the conveyer plate 16, which is seized by the cross-piece 32 moved by means of eccentrics or in other suitable manner, is moved by this crosspiece 32 in the direction of the arrow 33 and is pressed against the ends of the splints. These latter enter into the holes in the plate 16 and remain in the same, after which the cross-piece 32 and the filled plate 16 move backward and draw the splints out of the holes in the intermediate receiver 26. The conveyer plates 16 move step by step in the direction of the arrow 34, and the drum 27 is rotated step by step in the direction of the arrow 35, but it is evident that these directions may also be reversed, and that the insertion of the splints into the plates 16 may also take place in another position than the one shown. The intermediate receivers 26 may also form an endless chain or in any other manner be moved between the two positions where the filling and emptying of the same take place.

The lateral movement for filling the intermediate rows of holes of the intermediate receiver 26 about to be filled is effected according to the embodiment shown in the following manner: The receiver is influenced by a coil spring 36 which tends to press the same to one side (to the right in Fig. 8) so that one face 37 of a notch in the receiver bears against a stop bar 38 on the drum. In this position of the receiver the first insertion takes place. The receiver 26 is then moved to the opposite side (to the left) by a stronger coil spring 39 acting upon a slide-piece 41 previously held back by an arm 40, which slide-piece now moves the receiver 26 to the left until the other face 42 of the said notch bears against the bar 38 (see Fig. 8). In this position the second insertion takes place so that the intermediate receiver becomes filled. Also in this embodiment the grooved plates 3 may, of course, be made single or double and be placed at any suitable distance from each other, as in the embodiment described above.

By the invention described above it is possible from a single splint magazine for each stroke of the machine to fill long conveyer plates of a breadth corresponding up to 15 or 20 rows of holes. It is easily understood that this is of an exceedingly great importance for the output capacity of the entire machine.

Instead of moving the conveyer plates or the intermediate receivers laterally relatively to the filling device, it is, of course, possible to move this latter laterally one or several times relatively to the conveyer plates or the intermediate receivers, in which case the conveyer plates need only receive one movement, as heretofore.

I claim:

1. The method of filling match splints into conveyer plates, consisting in transferring the splints from a filling device into a receiving device which devices are moved relatively to each other during the filling in a lateral direction approximately at right angles to the direction of feeding the receiving device past the filling device and approximately at right angles to the direction of feeding the splints between the devices, the movement in the said lateral direction being effected by steps of a length equal to a multiple of the distance in the same direction between rows of splint receivers of the receiving device, in such manner that periodically a plurality of rows of splint receivers and then the intermediate rows of receivers are filled with splints, substantially as described.

2. The method of filling match splints into conveyer plates, consisting in transferring the splints from a filling device into a receiving device which devices are moved at intervals relatively to each other during the filling in a lateral direction approximately at right angles to the direction of feeding the receiving device past the filling device and approximately at right angles to the direction of feeding the splints between the devices, the movement in the said lateral direction being effected by steps of a length equal to a multiple of the distance in the same direction between rows of splint receivers of the receiving device, in such manner that periodically a plurality of rows of splint receivers and then the intermediate rows of receivers are filled with splints, substantially as described.

3. In a means for filling match splints into conveyer plates, the combination of a filling device, receiving devices provided with rows of splint receivers, guides for guiding the movement of the receiving devices past the filling device in a direction approximately at right angles to the direction of feeding the splints between said filling and receiving devices, and means for moving the filling device and the receiving devices relatively to one another a distance equal to a multiple of the distance between said rows of splint receivers in a direction approximately at right angles to the first-named direction and to the direction of feeding the splints between the devices, substantially as and for the purpose set forth.

4. In a means for filling match splints into conveyer plates, the combination of a filling device, conveyer plates provided with rows of splint receivers, guides for guiding the movement of the conveyer plates past the filling device in a direction approximately at right angles to the direction of feeding the splints into the conveyer plates, and means for moving the filling device and the conveyer plates relatively to one another a distance equal to a multiple of the distance betwen said rows of splint receivers in a direction approximately at right angles to the first-named direction and to the direction of feeding the splints into the conveyer plates, substantially as and for the purpose set forth.

5. In a means for filling match splints into conveyer plates, the combination of a filling device, conveyer plates, intermediate receivers provided with rows of splint receivers between the filling device and the conveyer plates, means for guiding said intermediate receivers past the filling device in a direction approximately at right angles to the direction of feeding the splints into said receivers, and means for moving the intermediate receivers and the said filling device relatively to one another a distance equal to a multiple of the distance between said rows of splint receivers in a direction approximately at right angles to the first-named direction and to the direction of feeding the splints into said receivers, substantially as and for the purpose set forth.

6. In a means for filling match splints into conveyer plates, the combination of a filling device consisting of a magazine, approximately vertical plates in said magazine of different heights for causing any splints lying crosswise in the magazine to stand on end, approximately vertical rows of horizontal grooves in said plates for receiving the splints, and approximately vertical rows of ejecting fingers playing in the grooves of each plate, receiving devices provided with approximately vertical rows of splint receivers, guides for guiding the movement of the receiving devices past the filling device in a direction approximately at right angles to the direction of feeding the splints between said filling and receiving devices, and means for moving the filling device and the receiving devices relatively to one another a distance equal to a multiple of the distance between said rows of splint receivers in a direction approximately at right angles to the first-named direction and to the direction of feeding the splints between the devices, substantially as and for the purpose set forth.

7. In a means for filling match splints into conveyer plates, the combination of a filling device consisting of a magazine, approximately vertical plates in said magazine of different heights for causing any splints lying crosswise in the magazine to stand on end, approximately vertical rows of horizontal grooves in said plates for receiving the splints, approximately vertical rows of ejecting fingers playing in the grooves of each plate, walls between said plates preventing the exit of any splints except those in the grooves, said walls being movable forwad and backward in the direction of length of the splints in the magazine, and bottoms between said plates provided with open spaces adjacent said walls, receiving devices provided with approximately vertical rows of splint receivers, guides for guiding the movement of the receiving devices past the filling device in a direction approximately at right angles to the direction of feeding the splints between said filling and receiving devices, and means for moving the filling device and the receiving devices relatively to one another a distance equal to a multiple of the distance between said rows of splint receivers in a direction approximately at right angles to the first-named direction and to the direction of feeding the splints between the devices, substantially as and for the purpose set forth.

8. In a means for filling match splints into conveyer plates, the combination of a filling device, conveyer plates, intermediate receivers provided with rows of splint receivers between the filling device and the conveyer plates, the said intermediate receivers being so connected with each other that they form a closed circuit, means for guiding said intermediate receivers past the filling device in a direction approximately at right angles to the direction of feeding the splints into said receivers, and means for moving the intermediate receivers and the said filling device relatively to one another a distance equal to a multiple of the distance between said rows of splint receivers in a direction approximately at right angles to the first-named direction and to the direction of feeding the splints into said receivers, substantially as and for the purpose set forth.

9. In a means for filling match splints into conveyer plates, the combination of a filling device, conveyer plates, intermediate receivers between the filling device and the conveyer plates, the said intermediate receivers being so connected with each other that they form a closed circuit, and consisting of plates with rows of cells for receiving the splints, a stationary support for the splints in the cells, means for guiding said intermediate receivers past the filling device in a direction approximately at right angles to the direction of feeding the splints into said receivers, and means for moving the intermediate receivers and the said filling device relatively to one another a distance equal to a multiple of the distance between said rows of cells in a direction approximately at right angles to the first-named direction and to the direction of feeding the splints into said receivers, substantially as and for the purpose set forth.

JOHN GOTTHARD SJÖSTRÖM.

Copies of this patent may be obtained for five cents each by addressing the "Commissioner of Patents, Washington, D. C."